Aug. 18, 1942.  C. J. JOHNSON  2,293,651
VALVE LAPPING MACHINE
Filed Dec. 24, 1940  6 Sheets-Sheet 1

Charles J. Johnson
INVENTOR.
J. Vincent Martin
and
Ralph R. Browning
ATTORNEYS

Aug. 18, 1942.    C. J. JOHNSON    2,293,651
VALVE LAPPING MACHINE
Filed Dec. 24, 1940    6 Sheets-Sheet 5
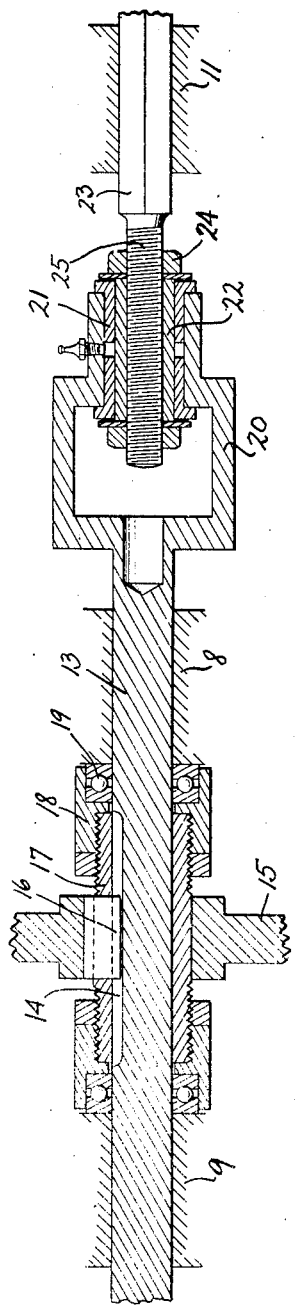
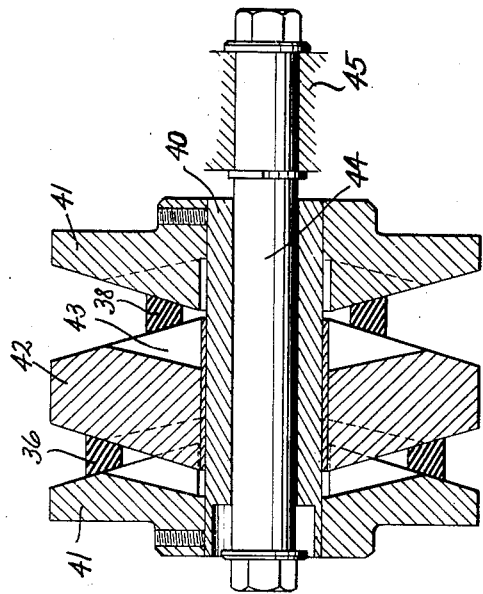
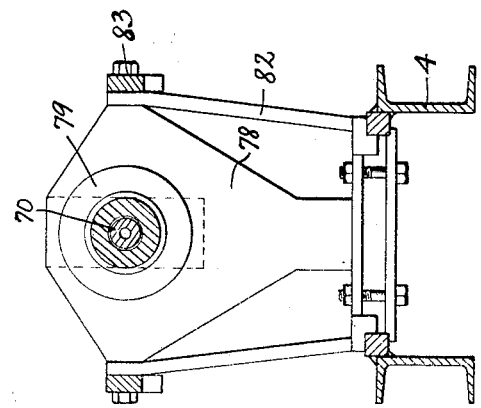
Charles J. Johnson.
INVENTOR.
BY J. Vincent Martin
and
Ralph R. Browning.
ATTORNEYS Aug. 18, 1942.  C. J. JOHNSON  2,293,651
VALVE LAPPING MACHINE
Filed Dec. 24, 1940  6 Sheets—Sheet 6

Charles J. Johnson.
INVENTOR.
BY
ATTORNEYS

Patented Aug. 18, 1942

2,293,651

UNITED STATES PATENT OFFICE 2,293,651

VALVE LAPPING MACHINE

Charles J. Johnson, Houston, Tex., assignor to Reed Roller Bit Company, Houston, Tex., a corporation of Texas Application December 24, 1940, Serial No. 371,527

14 Claims. (Cl. 51—27)

This invention relates to a lapping apparatus and has for its general object the provision of an apparatus whereby segments which are intended to form the closure members of a plug type valve may be ground or lapped in on their seating surfaces within the valve body.

In the machines heretofore used for grinding or honing the insides of cylindrical members there has been no way of obtaining a completely balanced pressure outwardly against the cylinder by the lapping members so that the grinding would be uniform. Neither has there been any convenient way of applying such a pressure which could be readily and exactly adjusted to any desired pressure. Furthermore, an attempt to use previously known types of lapping apparatus has failed to provide satisfactory lapping results in a valve such as that above referred to.

It is, therefore, an object of this invention to provide a means for holding the segments to be lapped into place within the cylindrical valve body and of applying to them an expanding pressure so that they will exert a completely balanced and uniform lapping pressure against the inside surface of the valve body.

In addition to the foregoing, the lapping machines employed in the past for generally similar purposes have not provided any means for rotating the lapping segments or shoes and simultaneously causing them to reciprocate in an endwise direction, together with means for independently adjusting the speed of rotation and the frequency and degree of oscillation.

It is, therefore, a further object of this invention to provide a machine in which the speed of rotation may be adjusted without in any way disturbing the extent or rate of oscillation, and the extent and rate of oscillation may each likewise be independently adjusted without disturbing in any manner the speed of rotation of the lapping devices.

With the foregoing and other objects in view, certain embodiments of this invention are set forth by way of illustration in the accompanying drawings wherein:

Fig. 6 is a longitudinal cross section through a portion of the main shaft which drives the grinding or lapping members and showing the manner of connecting the rotating and reciprocating parts thereto;

Fig. 7 is a transverse cross section through the main shaft and one of its supports, the same being taken along the line 7—7 of Fig. 2;

Fig. 8 is a longitudinal cross section through one of the speed changing pulleys employed in connection with this machine;

Figure 1:
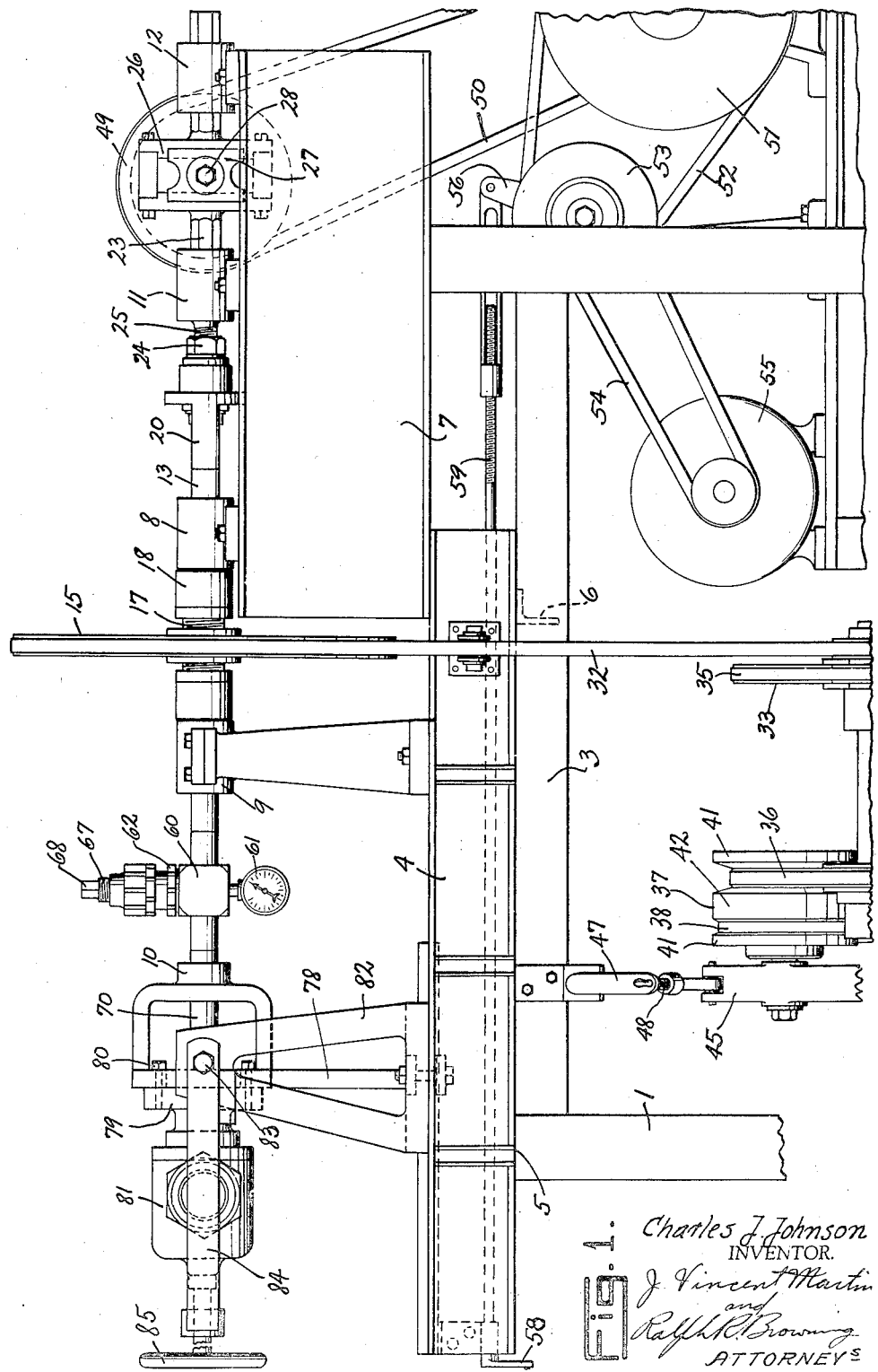
Fig. 1 is a side elevation of a lapping machine constructed in accordance with this invention, the same being illustrated fully assembled and with the work in place thereon.

In the preferred embodiment of the machine illustrated in the drawings, the same is mounted upon a frame of upright members 1 and horizontal members 2 connecting said uprights at the bottom and horizontal members 3 connecting the uprights at the top thereof.

Extending part way across the horizontal members 3 at the top of the machine is a pair of spaced channel irons 4, the outer end portions of these channel irons being supported at 5 by said horizontal members 3 and inner end portions of the same being supported by a special cross angle bar 6 extending across the frame intermediate the ends thereof.

Resting on top of the inner ends of the channel irons 4 and extending to the opposite end of the frame and resting thereon is a second pair of channel irons 7. The end of the frame on which the channel irons 7 rest is raised somewhat above the remainder of the frame to a level approximately the same as the upper surfaces of the channel bars 4 so that the channel members 7 will lie substantially horizontally. The channel members 4 and 7 may be secured to the frame and to each other by welding, riveting, or any other suitable means.

The main shaft of the machine is carried in journal bearings indicated at 8, 9 and 10 and in sliding bearings 11 and 12. The bearings 9 and 10 are mounted on the channel members 4 and the bearings 8, 11 and 12 on the channel members 7. The main shaft consists of several sections. The section which is rotatably and slidably mounted in the bearings 8 and 9 and indicated at 13 is provided with a spline 14 intermediate said bearings and the pulley 15 has an internal spline 16 in slidable engagement therewith. This pulley is carried on a cylindrical hub 17 which is in turn mounted by means of fitting 18 on thrust bearings 19 which engage the ends of bearings 8 and 9 to prevent endwise movement of the pulley. The shaft is thus enabled to slide endwise with respect to its bearings 8 and 9 and also with respect to the pulley 15 but is constrained to rotate with the pulley. The pulley on the other hand is rotatable for the purpose of rotating the shaft but is restrained against endwise movement with the shaft.

The shaft 13 is formed at one end with a yoke 20 having an axial bearing journal 21 adapted to receive the bearing member 22 on the end of the shaft section 23. The bearing member 22 is longitudinally adjustable with respect to the shaft section 23 and is held in place by means of nuts 24 on the threaded end portion 25 of the said shaft section.

The shaft section 23 is of hexagonal or other noncircular cross section and the bearings 11 and 12 are of similar cross section, so that the shaft section may slide longitudinally but cannot be rotated. The connections just described between the shaft section 23 and 13 make it possible for the shaft section 23 to reciprocate and to transmit reciprocatory motion to the shaft section 13 but prevent the shaft section 23 from rotating while the shaft section 13 is being rotated by means of the pulley 15.

The shaft section 13 is provided with a cross head consisting of the guides 26 and the slide 27. The slide 27 is carried on the end of a crank pin 28. This crank pin 28 is in turn carried on a slide 29 mounted on a guide 30. The element 29 can be adjusted with respect to the element 30 by means of adjusting screws 31 so as to adjust the throw of the crank pin 28 to such value as may be desired. The pulley 15 is driven by means of a belt 32 and this belt is driven by a series of pulleys and belts consisting of the pulleys 33 and 34 and the belts 35 and 36. The belt 36 travels on an adjustable speed pulley mechanism of a well-known variety illustrated in Fig. 8, this adjustable speed pulley being indicated generally at 37 and being driven by means of another belt 38 from a suitable motor 39.

The belts employed in connection with the adjustable speed pulley 37 are as shown in Fig. 8 V-type belts. This adjustable speed pulley consists of a rotatable cylindrical member 40 having fixedly spaced end members 41 mounted thereon and an intermediate member 42 between the end members 41. The member 42 and the end members 41 are provided with interfitting portions 43 so that the intermediate member is constrained to rotate with the end members 41.

The adjustable speed pulley is mounted on a shaft 44 which is in turn carried by a lever 45. This lever is pivoted on a fixed pivot 46 spaced from the shaft 44 in one direction and may be shifted about the pivot 46 so as to shift the axis of the adjustable speed pulley by means of a crank 47 and screw 48 operated thereby. It will be seen that when the crank 47 is rotated in one direction or the other the adjustable speed pulley will be moved so as to vary its position with respect to the pulley which drives and the pulley which it drives. The increased tension on one belt and the decreased tension on the other will cause a shifting of the intermediate member 42 and this shifting will vary the effective radius of that portion of the pulley on which each of these belts operates. As one radius increases the other will decrease and it will readily be seen that the effective ratio will be changed in one direction or the other depending upon the direction of adjustment of the crank 47.

The crank 28 is rotated by means of a pulley 49, the same being driven in turn by means of a belt 50, a pulley assembly 51, a belt 52, an adjustable ratio pulley 53 similar to that just described, a belt 54 and motor 55. The adjustable ratio pulley 53 is carried on a lever arm 56 pivoted at 57 to the frame and controlled by means of a crank 58 and a screw 59.

It will be seen by this arrangement the frequency of the reciprocation produced by the crank 28 can be regulated readily by means of the crank 58. The amplitude of such reciprocation can be changed to such amount as may be desired by means of the adjustments provided by the screws 31 and this latter adjustment is a highly important one in connection with a machine of this type as will be hereinafter pointed out. This adjustment makes possible the use of this machine for lapping valves of various sizes. The shaft section 13 may also be adjusted axially with respect to the reciprocating mechanism by means of the nuts 24.

Figure 9:
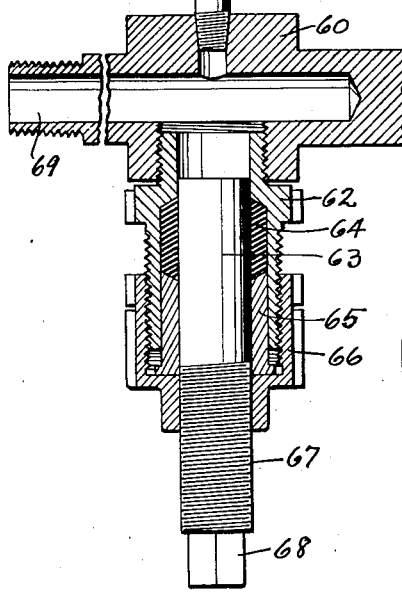
Fig. 9 is a longitudinal cross section through the means for adjusting the hydraulic pressure applied to the laps for expanding the same within the body of the valve.
Figure 15:
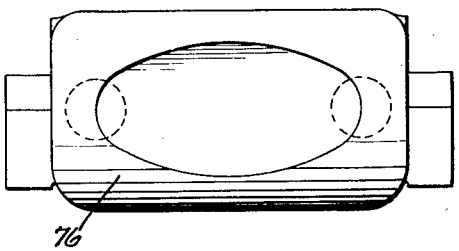
Fig. 15 is an elevation showing the seating face of one of the segments of the valve which is adapted to be lapped in by the apparatus of this invention.

Mounted on the free end of the shaft section 13 is a device which may be referred to as a pump 60. This pump consists of a housing having a connection at one side for a pressure gauge 61 and at a position spaced circumferentially therefrom it is provided with a fitting 62 having a cylindrical chamber therein. The details of this pump are illustrated in Fig. 9 of the drawings and in this figure it will be seen that there is mounted within the fitting 62 a plunger 63, there being a packing 64 for forming a seal between the plunger and the interior of the fitting 62. This seal is maintained by means of a gland 65 held in place by a gland nut 66 threaded onto the fitting 62. The plunger 63 is provided with a threaded portion 67 and with a squared outer end 68 so that it may be turned and forced into or withdrawn from the chamber in the fitting 62.

The housing is provided with a bore 69 leading from one end thereof and communicating with the pressure gauge 61 and the chamber within the fitting 62. This pump device forms a part of the composite main shaft of the machine.

Connected to the free end of the pump 60 and extending through the bearing 10 is a part forming the stem 70 on which is carried the lapping head 71. This lapping head and the stem 70 thereof are likewise hollow and communicate with the bore 69 in the pump.

The lapping head is provided with a transverse bore adapted to receive opposed floating pistons 72. These pistons carry on their outer ends leaf spring 73 which may rock slightly about their mounting at 74 on the respective pistons. Each of these springs has at its opposite ends buttons or lugs 75 adapted to fit into openings in the rear of the valve closure segments or discs 76, which are to be lapped in place in the valve. The pistons 72 are provided with inter-engaging portions 77 so that they will be guided with respect to each other but they are freely movable both toward and away from each other and transversely with respect to the lapping head 71.

It will be seen that when the space within the pump and within the lapping head and its stem is filled with a liquid and the plunger 63 is moved into the fitting 62 by rotation, the hydraulic pressure within said space will cause the pistons 72 to move away from each other and expand the segments or discs 76 with respect to each other. It will further be seen that this action will provide a balanced expanding force for the discs 76 so that no more force can possibly be applied to one than to the other, the same being balanced against each other and freely slidable within the lapping head 71. It will also be apparent that due to the central rockable mounting of the springs 73 the buttons 75 on the ends of these springs will apply balanced forces to the rear surfaces of the discs 76. Thus, the discs will each be forced outwardly with an identical force and this force will be balanced from one end to the other of the discs. The lapping pressure upon the discs will, therefore, be made uniform throughout.

Figure 2:
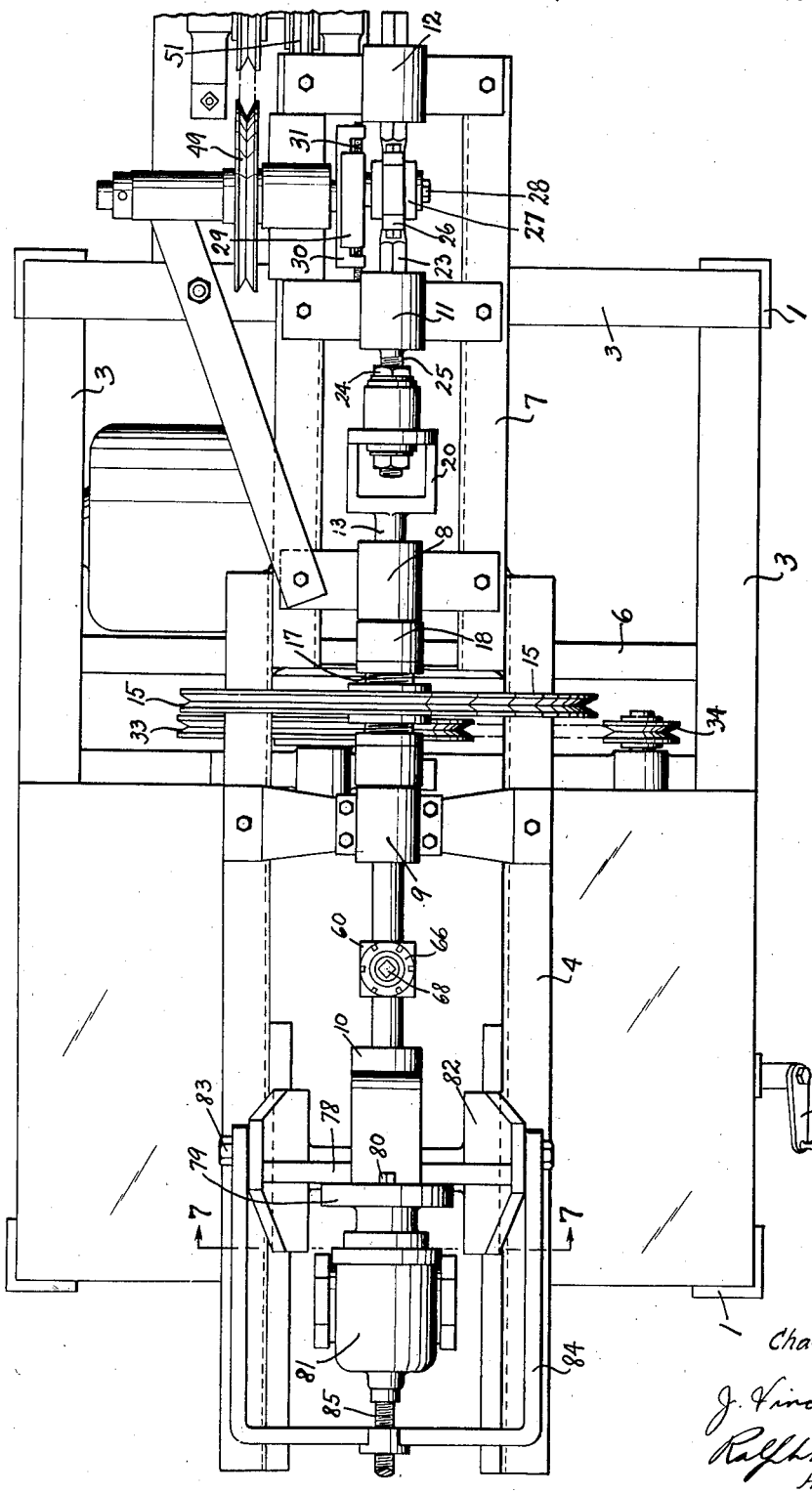
Fig. 2 is a top plan view of the same structure.
Figure 3:
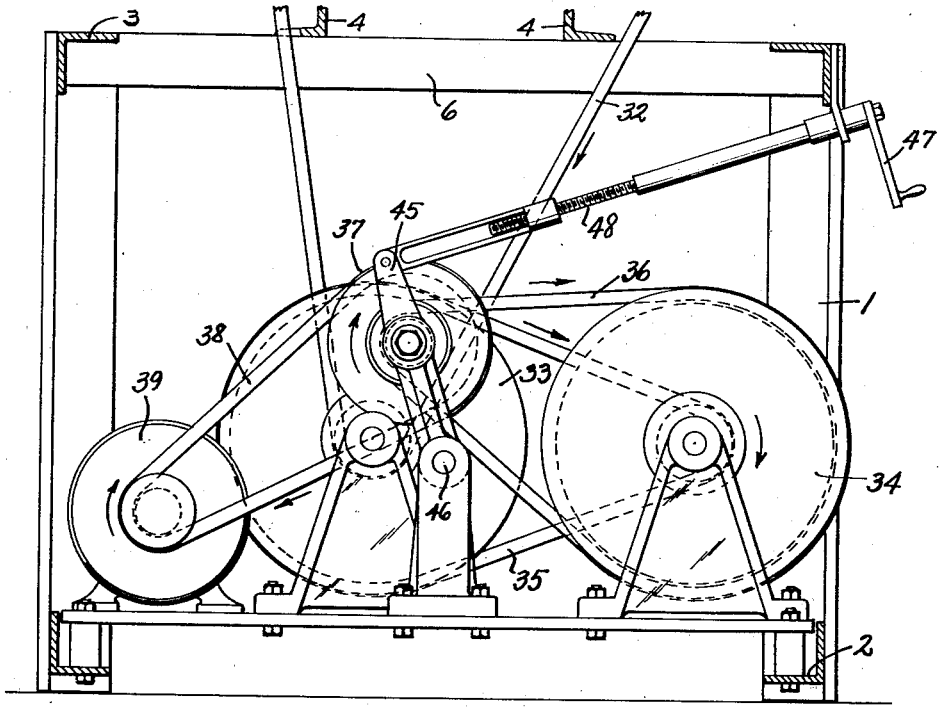
Fig. 3 is a view of the lower part of the same machine with the frame work shown in transverse section and the drive for producing and adjusting the rotation of the grinding parts shown in elevation.
Figure 4:
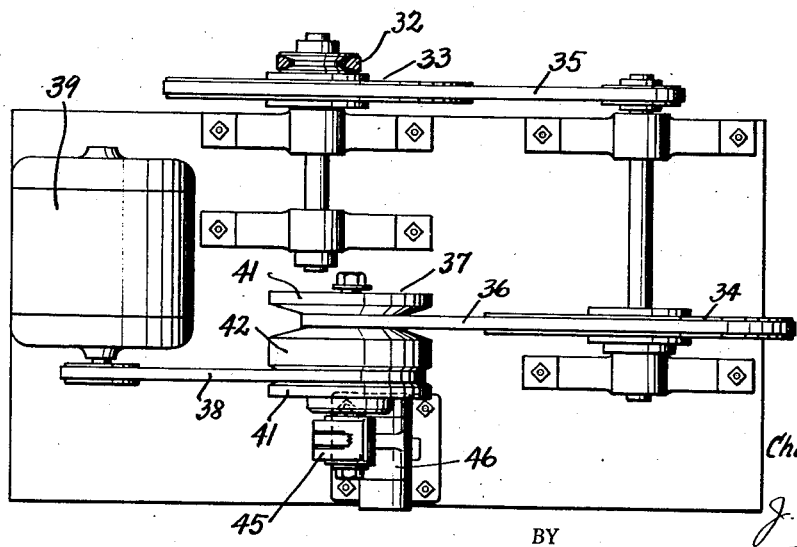
Fig. 4 is a top plan view of the apparatus shown in elevation in Fig. 3.
Figure 5:
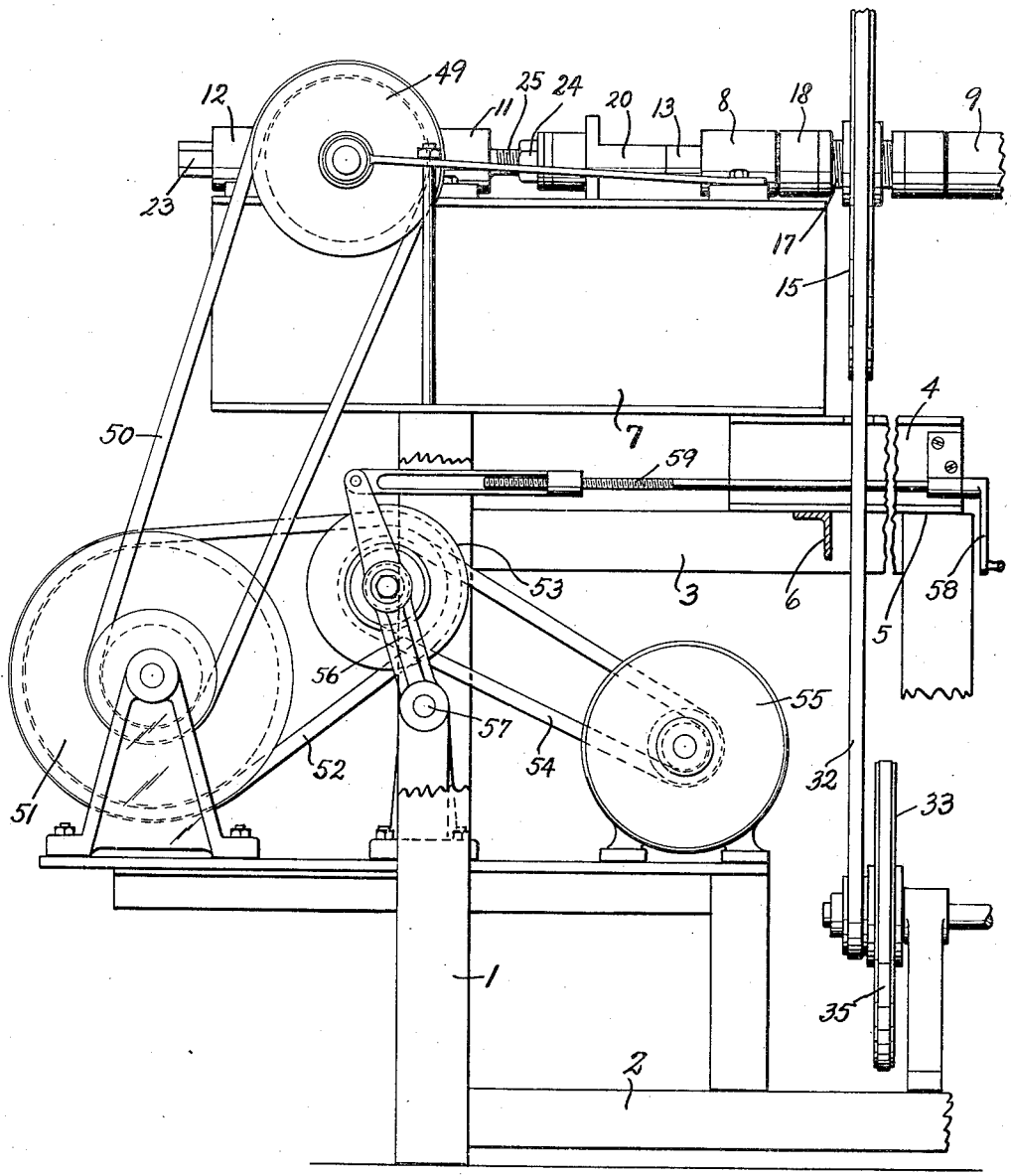
Fig. 5 is a view taken adjacent one end of the machine illustrated in Fig. 1 and showing in elevation the apparatus for driving and adjusting the rate of reciprocation of the grinding parts, parts of the figure being broken away for purposes of illustration.

The bearing 10 previously referred to is carried on a plate 78 which has an opening therethrough substantially larger than the stem 70 of the lapping head. The bearing 10 as will be clearly seen in Figs. 1 and 2 is offset from the plate 78 and supports the stem 70 at a position spaced from this plate. The enlarged opening through the plate is formed to receive an adapter 79 which is held thereon by means of bolts 80 and which is formed with a seat concentric with the axis of rotation of the main shaft and is adapted to receive and positively center a valve body 81 with respect to the axis of the main shaft.

Extending upwardly from the channel members 4 on each side of the plate 78 is a bracket 82, and to the upper ends of these brackets are pivotally secured at 83 the opposite ends of a yoke 84. This yoke is of a sufficiently great extent to straddle a valve body such as that which the machine is intended to receive and carries a clamping screw 85 which may be tightened against the valve body after the same has been placed in proper position so as to clamp the valve body in position for the closure members to be lapped therein.

Figure 12:
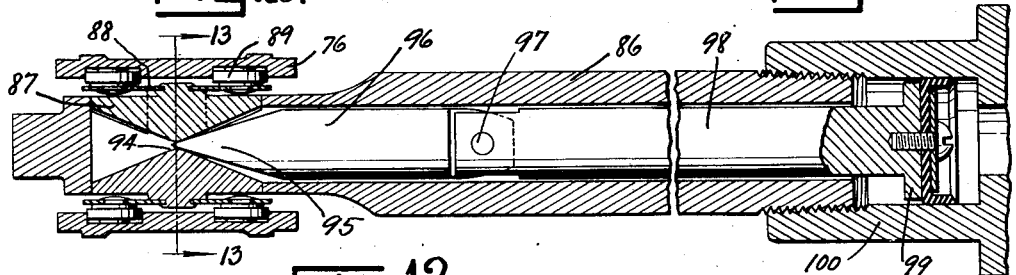
Fig. 12 is a view similar to Fig. 10 but showing a modification.
Figures 13, 14:
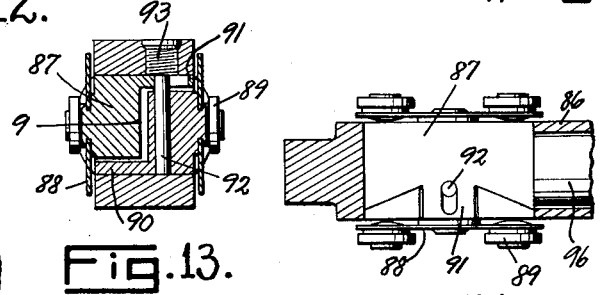
Fig. 13 is a transverse cross section taken along the line 13—13 of Fig. 12.
Fig. 14 is a view showing a longitudinal cross section taken at right angles to that shown in Fig. 12 and illustrating certain details of construction.

Referring now to Figs. 12, 13 and 14, there is illustrated a somewhat modified form of lapping head. The head in this case consists of a stem 86 which is hollow as in the previous instance and which has lateral openings therefrom adjacent one end to accommodate the slidable carriers 87 corresponding to the pistons 72 of Fig. 10. These carrier elements 87 are each provided with a rockably mounted spring bar 88 having buttons 89 or the like adjacent the opposite ends thereof for the purpose of receiving the closure members 76. The carriers 87 are provided with interfitting parts 90 and 91 and are held against complete separation from each other by means of a pin 92. The pin 92 may be put in place through an opening which is later plugged by means of a threaded plug, as shown at 93.

The carrier members 87 have adjacent parts which closely approach each other as shown at 94 in Fig. 12, and these parts are adapted to receive the wedge-shaped end 95 of the floating member 96. The member 96 is pivoted at 97 to the plunger 98 which extends back through the stem 86 and carries on its extreme end a piston 99. The piston 99 is disposed in a cylindrical fitting 100 and this fitting is in turn an integral part of a pump, such as that illustrated in Fig. 9. The pump may be identical in all respects with that shown in Fig. 9 except that the part designated 100 in Fig. 12 will replace the threaded connection for the valve lapping head which is shown on the valve body on Fig. 9.

It is to be noted in connection with the apparatus just described that the speed of rotation of the main shaft and hence of the segments which are being lapped into the valve body may be adjusted within the limits of the apparatus to any value desired by means of the crank 47. This adjustment may be made without disturbing any other adjustment in connection with the machine.

It will further be seen that the frequency of the reciprocation of the main shaft and of the closure members, which are being lapped into a valve body, may be adjusted independently of all other adjustments on the machine by means of the crank 58. Not only may the frequency of this reciprocation be adjusted independently of all other adjustments, but also the extent of reciprocation may be adjusted independently of its frequency and independently of all other adjustments by means of the adjusting screws 31 which change the throw of the crank pin 28. This is highly important in connection with this machine because of the fact that it makes it possible for the machine to be used in connection with different sizes of valves. Naturally, a smaller valve requires and permits a shorter reciprocatory movement than a larger valve and this adjustment makes it possible to provide either a long or a short reciprocatory movement to accommodate valves of different sizes. In addition to these adjustments with respect to the reciprocating apparatus, it should be noted that the nuts 24 may be employed for the purpose of adjusting the shaft section 13, the pump 60, and the lapping head longitudinally with respect to their common axis. This again is for the purpose of making this device adaptable to valves of different sizes because where a valve of a large size is to be lapped, the lapping head would, of course, be required to be positioned further to the left, as seen in Fig. 1. Whereas, when the machine is used for a smaller valve, the lapping head would be further to the right. Also, different types of valves may be accommodated by this machine by virtue of the adjustments just referred to.

Figure 10:
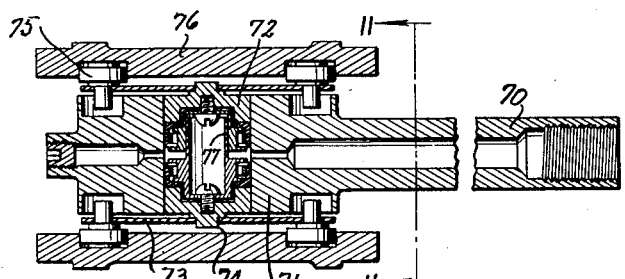
Fig. 10 is a longitudinal cross section through the lap expanding mechanism showing laps mounted thereon in the form of the segments which are to be lapped into their seats in a valve body.

In the operation of the machine it will readily be seen that a pair of valve closure members 76 will be put in place either on the lapping head, as shown in Fig. 10, or on that shown in Fig. 12, and that the valve body 81 will then be slipped over these closure members and the lapping head. The valve body will be centered by means of the adapter 79 and then clamped into position by means of the clamping screw 85. The space within the lapping head in Fig. 10 and within the pump shown in Fig. 9 being filled with a liquid, pressure is now applied to this liquid by means of the ram 63 until the desired pressure is indicated on the gauge 61. This hydraulic pressure will apply equally to the pistons or carriers 72 of Fig. 10 and will tend to move these carriers away from each other, applying to them perfectly balanced forces. These forces will be transmitted through the spring bars 73 and the buttons 75 to the valve closure members 76 and because the spring bars are rockably mounted on the carrier pistons 72 there will not only be an equally or balanced force applied to each of the closure members, but this force on each closure member will be balanced upon the two ends thereof so that a substantially uniform force will be applied to each closure member throughout its length.

The apparatus is then adjusted to provide the desired speed of rotation, frequency and throw of reciprocation and with the application of a proper lapping compound the valve closure members will be efficiently lapped to a proper seat within the valve body.

The operation in connection with the lapping head shown in Figs. 12, 13 and 14 is substantially the same, it being noted that in this case the application of hydraulic pressure operates on the piston 99 to move it to the left as seen in Fig. 12 and this in turn forces the floating wedge 95 between the carriers 87 to apply a perfectly balanced force thereto tending to separate the carriers. This force is balanced because the wedge 95 is floatingly mounted by means of the pivot 97 on the plunger 98 and may shift laterally to permit the forces on the carriers to balance against each other.

Figure 11:
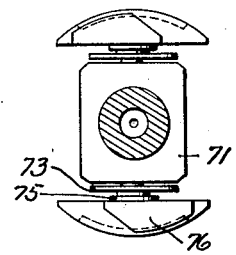
Fig. 11 is a transverse section taken along the line 11—11 of Fig. 10.

It may be explained that the form illustrated in Figs. 12, 13 and 14 is employed in those cases where the valves to be lapped are so small that to provide a structure such as shown in Figs. 10 and 11 might be inconvenient.

In every case it is to be noted that the application of the balanced forces to the carriers for the valve closure members is accomplished by means of a mechanism that is easily accessible. Also, in each instance it is to be noted that the forces applied to the closure members may be accurately controlled and that the same forces may be applied to the closure members of successive valves with a high degree of accuracy by merely tightening up on the ram 63 until a given pressure is indicated by the gauge 61. Thus, a uniformity of lapping on successive valves may be easily obtained by this apparatus and a product of a high and uniform quality may be produced.

Having described my invention, I claim:

1. A lapping head for a valve lapping machine comprising a rotatable body having lateral openings therein, oppositely movable carriers mounted in said openings, means on each of said carriers adapted to receive a valve closure member to be lapped in a valve body, and floating means having floating movement laterally of the axis of the rotatable body and adapted to be forced between said carriers to force them away from each other with a balanced force.

2. A lapping head for a valve lapping machine comprising a rotatable body having lateral openings therein, oppositely movable carriers mounted in said openings, means on each of said carriers adapted to receive a valve closure member to be lapped in a valve body, and hydraulically actuated floating means having floating movement laterally of the axis of the rotatable body and adapted to be forced between said carriers to force them away from each other with a balanced force.

3. A lapping head for a valve lapping machine comprising a rotatable body having lateral openings therein, oppositely movable carriers mounted in said openings, means on each of said carriers adapted to receive a valve closure member to be lapped in a valve body, hydraulically actuated floating means having floating movement laterally of the axis of the rotatable body and adapted to be forced between said carriers to force them away from each other with a balanced force, and means for applying to said hydraulically actuated means a predetermined hydraulic pressure.

4. A lapping head for a valve lapping machine comprising a rotatable body having lateral openings therein, oppositely movable carriers mounted in said openings, means on each of said carriers adapted to receive a valve closure member to be lapped in a valve body, a floating wedge having floating movement laterally of the axis of the rotatable body and adapted to be forced between said carriers to force them away from each other with a balanced force, and means for forcing said wedge between said carriers.

5. A lapping head for a valve lapping machine comprising a rotatable body having lateral openings therein, oppositely movable carriers mounted in said openings, means on each of said carriers adapted to receive a valve closure member to be lapped in a valve body, a floating wedge means having floating movement laterally of the axis of the rotatable body and adapted to be forced between said carriers to force them away from each other with a balanced force, and a hydraulic piston connected with said floating wedge means for forcing it between said carrier members.

6. A lapping head for a valve lapping machine comprising a rotatable body having lateral openings therein, oppositely movable carriers mounted in said openings, means on each of said carriers adapted to receive a valve closure member to be lapped in a valve body, each of said carriers having a piston-like part exposed to the interior of said body of the lapping head and mounted for floating movement laterally of the axis of said rotatable body, and means for applying a fluid under pressure to the interior of the body of said lapping head to force said carriers apart with a balanced force.

7. A lapping head for a valve lapping machine comprising a rotatable body having lateral openings therein, oppositely movable carriers mounted in said openings, a cross bar rockably mounted adjacent its midportion on each of said carriers and having parts equidistant from its midportion on opposite sides thereof for engaging a valve closure member to be lapped in a valve body to apply balanced forces to spaced portions thereof, and floating means having floating movement laterally of the axis of the rotatable body and adapted to be forced between said carriers to force them away from each other with a balanced force.

8. A lapping head for a valve lapping machine comprising a body having lateral openings therein, oppositely movable carriers mounted in said openings, a spring cross bar rockably mounted adjacent its mid-portion on each of said carriers and having parts equidistant from its mid-portion on opposite sides thereof for engaging a valve closure member to be lapped in a valve body to apply balanced forces to spaced portions thereof, and floating means adapted to be forced between said carriers to force them away from each other with a balanced force.

9. A lapping head for a valve lapping machine comprising a rotatable body having lateral openings therein, oppositely movable carriers mounted in said openings, means on each of said carriers adapted to receive a valve closure member to be lapped in a valve body, floating means having floating movement laterally of the axis of the rotatably body and adapted to be forced between said carriers to force them away from each other with a balanced force, and means for indicating the balanced expanding force applied to said carriers by said last mentioned means.

10. A lapping head for a valve lapping machine comprising a rotatable body having lateral openings therein, oppositely movable carriers mounted in said openings, means on each of said carriers adapted to receive a valve closure member to be lapped in a valve body, a hydraulically actuated floating means having floating movement laterally of the axis of the rotatable body and adapted to be forced between said carriers to force them away from each other with a balanced force, and a hydraulic pressure gauge for indicating the hydraulic pressure applied to said floating means.

11. A lapping head for a valve lapping machine comprising a hollow shaft, a rotatable body carried by said shaft and having lateral openings therein, oppositely movable carriers mounted in said openings, means on each of said carriers adapted to receive a valve closure member to be lapped in a valve body, hydraulically actuated floating means having floating movement laterally of the axis of the rotatable body and adapted to be forced between said carriers to force them away from each other with a balanced force, and a plunger carried by said shaft and movable into and out of the hollow portion of said shaft for applying a desired pressure to a fluid body in said shaft and thereby actuating said floating means.

12. A lapping head for a valve lapping machine comprising a hollow shaft, a rotatable body carried by said shaft and having lateral openings therein, oppositely movable carriers mounted in said openings, means on each of said carriers adapted to receive a valve closure member to be lapped in a valve body, hydraulically actuated floating means having floating movement laterally of the axis of the rotatable body and adapted to be forced between said carriers to force them away from each other with a balanced force, a plunger carried by said shaft and movable into and out of the hollow portion of said shaft for applying a desired pressure to a fluid body in said shaft and thereby actuating said floating means, and a pressure gauge carried by said shaft and communicating with the hollow interior thereof for indicating the hydraulic pressure existing therein.

13. A lapping head for a valve lapping machine comprising a rotatable body having lateral openings therein, oppositely movable carriers mounted in said openings, said carriers having interengaging parts and being guided thereby for straight line movement with respect to each other, means on each of said carriers adapted to receive a valve closure member to be lapped in a valve body, and floating means having floating movement laterally of the axis of the rotatable body and adapted to be forced between said carriers to force them away from each other with a balanced force.

14. In a valve lapping machine, a main shaft, means for simultaneously rotating said shaft about and reciprocating it along a fixed axis, a lapping head on said shaft for carrying valve closure members to be lapped in a valve body, an adapter having a part for receiving a portion of a valve body and centering it with respect to said axis and about said lapping head, and means for clamping a valve body in such centered position.

CHARLES J. JOHNSON.